(12) United States Patent
Kang (10) Patent No.: US 9,562,777 B2
(45) Date of Patent: Feb. 7, 2017

(54) AUTONOMOUS VEHICLE ASSISTANCE DEVICE

(71) Applicant: KOREA AEROSPACE RESEARCH INSTITUTE, Daejeon (KR)

(72) Inventor: Woo Yong Kang, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/955,338

(22) Filed: Dec. 1, 2015

(65) Prior Publication Data

US 2016/0187147 A1 Jun. 30, 2016

(30) Foreign Application Priority Data

Dec. 24, 2014 (KR) ........................ 10-2014-0188407

(51) Int. Cl.
*G01C 21/26* (2006.01)
*G01S 19/01* (2010.01)
*H04W 4/04* (2009.01)

(52) U.S. Cl.
CPC ............... *G01C 21/26* (2013.01); *G01S 19/01* (2013.01); *H04W 4/046* (2013.01)

(58) Field of Classification Search
CPC ......... G01C 21/26; G01S 19/01; H04W 4/046
USPC ....................................................... 701/468
See application file for complete search history.

(56) References Cited

U.S. PATENT DOCUMENTS 8,296,065 B2* 10/2012 Haynie ................. B61L 25/025
701/449

| 2006/0064244 | A1* | 3/2006 | Robbins | G01C 15/00 701/471 |
| 2008/0133982 | A1* | 6/2008 | Rawlins | H03F 1/0211 714/699 |
| 2008/0161987 | A1* | 7/2008 | Breed | G08G 1/161 701/27 |
| 2010/0256836 | A1* | 10/2010 | Mudalige | G08G 1/163 701/2 |
| 2010/0324815 | A1* | 12/2010 | Hiruta | G01C 21/30 701/532 |

FOREIGN PATENT DOCUMENTS

JP 10062514 A 3/1998
KR 20050108811 A 11/2005

OTHER PUBLICATIONS

Wooyaong Kang, et al., "A Study on the Performane Requirement of Precise Digital Map for Road Lane Recognition", Journal of Institute of Control, Robotics and Systems (2011), 17(1) pp. 47-53.

* cited by examiner

*Primary Examiner* — Atul Trivedi
(74) *Attorney, Agent, or Firm* — Innovation Capital Law Group, LLP; Vic Lin (57) ABSTRACT

Provided is an autonomous vehicle assistance device and method that may precisely determine a position of a vehicle based on input position error information. The autonomous vehicle assistance device includes a communicator configured to receive satellite navigation information, correction information transmitted from a base station, and position error information transmitted from a fixed body, and a vehicle position determiner configured to calculate first position information corresponding to the received satellite navigation information and correction information and to calculate a current position of a vehicle by correcting the first position information based on the position error information.

10 Claims, 6 Drawing Sheets

AUTONOMOUS VEHICLE ASSISTANCE DEVICE

CROSS-REFERENCE TO RELATED APPLICATION

This application claims the priority benefit of Korean Patent Application No. 10-2014-0188407, filed on Dec. 24, 2014, in the Korean Intellectual Property Office, the disclosure of which is incorporated herein by reference.

BACKGROUND

1. Field of the Invention

Embodiments relate to an autonomous vehicle assistance device, and more particularly, to an autonomous vehicle assistance device and method that may precisely determine a position of a vehicle based on input position error information.

2. Description of the Related Art

Currently, research regarding autonomous driving of a vehicle has been actively conducted. In general, autonomous driving indicates traveling by analyzing information acquired through a variety of sensors installed in a vehicle and satellite navigation information based on road map information and by controlling a driving of the vehicle from a specific start point to an end point on the roads according to a determined logic.

In a vehicular navigation system according to the related art, a general global positioning system (GPS) satellite navigation code has a position precision level close to 10 m. Accordingly, an accurate position of a vehicle may not be recognized with an existing GPS device. Research using a satellite navigation carrier is ongoing to accomplish a further enhanced position precision. Position information based on tens of centimeter (cm) may be acquired using a satellite navigation carrier.

However, roads, including straight roads, intersections, and tunnels, are present in a variety of shapes and/or forms. Accordingly, there is a need to accurately verify a lane on which a vehicle is to be driven on the roads and to drive on the verified lane. In addition, a further high position precision level is desired. There is a need for an autonomous vehicle assistance device that may analyze satellite navigation position information transmitted in real time, may correct real-time position information by acquiring correction information, driving lane information, and a position information error, and may enhance a position precision.

SUMMARY

According to an aspect, there is provided an autonomous vehicle assistance device including a communicator configured to receive satellite navigation information, correction information transmitted from a base station, and position error information transmitted from a fixed body, and a vehicle position determiner configured to calculate first position information corresponding to the received satellite navigation information and correction information and to calculate a current position of a vehicle by correcting in which the first position information based on the position error information. The communicator may receive a position error vector in a heading direction of the vehicle and a position error vector in a direction perpendicular to the heading direction of the vehicle as the position error information.

The autonomous vehicle assistance device may further include a stop detector configured to detect whether the vehicle being driven is in a stop state. In response to the stop detector detecting the stop state of the vehicle, the communicator may transmit a request for position error information to a fixed body within a preset radius.

The autonomous vehicle assistance device may further include a vision detector configured to detect image information of a lane and to acquire driving lane information corresponding to the image information. The vehicle position determiner may correct the first position information based on the driving lane information and may calculate the current position of the vehicle. The vision detector may acquire, as the driving lane information, information regarding whether a corresponding driving lane corresponds to a first lane or a last lane based on a lane line of the driving lane.

According to another aspect, there is provided an autonomous vehicle assistance device including a communicator and an error calculator. The autonomous vehicle assistance device may be provided to a fixed body. The communicator is configured to receive satellite navigation information correction information transmitted from a base station. The error calculator is configured to acquire first position information corresponding to the satellite navigation system and the correction information, to calculate a difference value between the first position information and second position information stored in the autonomous vehicle assistance device, and to acquire a position error vector.

The communicator may receive a request for the position error vector from a vehicle within a preset radius. The communicator may transmit a unique identification signal of the autonomous vehicle assistance device corresponding to the second position information.

The error calculator may acquire the position error vector in each of a heading direction of the vehicle on a lane around a position at which the fixed body is installed and a direction perpendicular to the heading direction, in correspondence to the lane.

According to still another aspect, there is provided an autonomous vehicle assistance method including acquiring position information based on satellite navigation information and correction information, acquiring a position error vector from a fixed body to which a satellite navigation device is provided in a case in which a vehicle is stopped, calculating the position information based on the satellite navigation information and the correction information, and recognizing position information in which correction corresponding to the position error vector is made as a current position of the vehicle.

The autonomous vehicle assistance method may further include acquiring, from lane image information, lane position information about a position of a lane on which the vehicle is being driven, calculating a difference value between the position information and the lane position information, and recognizing position information in which correction corresponding to the difference value is made as the current position of the vehicle. The lane image information may be acquired from a color of a lane line present between lanes. The position error vector may include an error value in each of a direction in which the vehicle is being driven and a direction perpendicular to the direction.

According to still another aspect, there is provided a non-transitory computer-readable medium storing a program to implement the autonomous vehicle assistance method.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the accompanying drawings.

Although terminologies used in the following description are general and common ones selected in the related art, some other terminologies may be present based on the development of technology and/or variation, custom, preference of one skilled in the art, and the like. Accordingly, terminologies used in the following description should not be understood to limit the technical spirit and should be understood as examples to explain the embodiments.

Also, in some cases, terminology arbitrarily selected by the Applicant may be used. In this case, the meaning of the terminology is to be described in the corresponding detailed description. Accordingly, the terminologies used in the following description should be understood based on the meanings of the terminologies and the overall contents in the specification instead of being understood as simple names of the terminologies.

Figure 1:
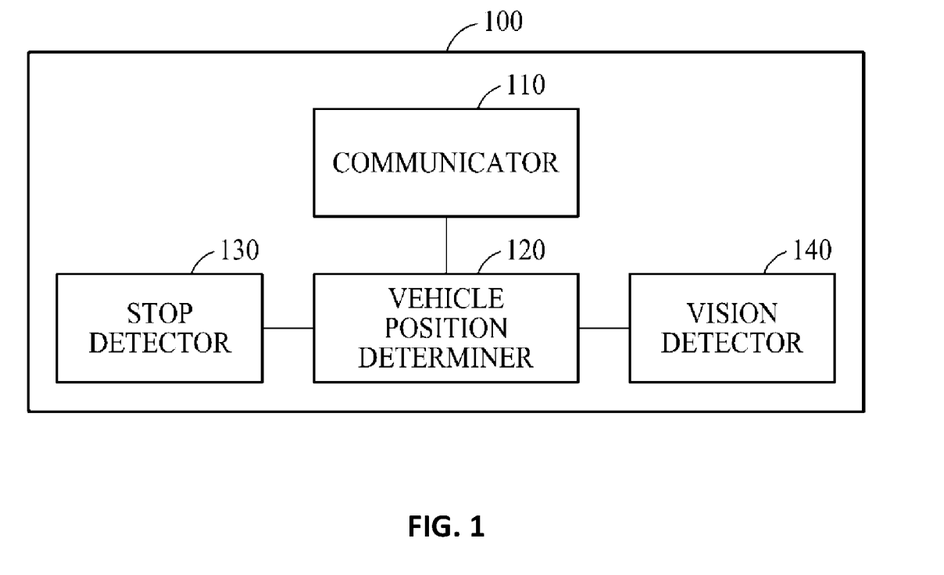
FIG. 1 is a block diagram illustrating an autonomous vehicle assistance device according to an embodiment.

FIG. 1 is a block diagram illustrating an autonomous vehicle assistance device according to an embodiment. Referring to FIG. 1, the autonomous vehicle assistance device 100 includes a communicator 110 and a vehicle position determiner 120. For example, without being limited thereto, the autonomous vehicle assistance device 100 may include a stop detector 130 and a vision detector 140.

The communicator 110 may receive satellite navigation information from an outside. The outside may include, for example, an artificial satellite for measuring a global positioning system (GPS). The satellite navigation information may include, for example, a stand-alone code. Also, the communicator 110 may transmit a signal requesting position error information within a preset distance radius. The distance radius denotes a value that is adjustable by a user. When a fixed body to which a satellite navigation device is provided is present within the distance radius, the communicator 110 may receive position error information.

The position error information may include, as the position information, a position error vector in a heading direction of a vehicle within a lane and a position error vector in a direction perpendicular to the heading direction of the vehicle. In general, existing satellite navigation information may be transmitted and received in a form of three-dimensional (3D) coordinate system information. However, in the autonomous vehicle assistance device 100 according to an embodiment, since information corresponding to a z axis of a coordinate system is not used, position error information may be transmitted and received in a two-dimensionally converted vector form in order to achieve fast signal processing and transmission of position transmission.

The vehicle position determiner 120 may determine a current position of the vehicle by analyzing position information of the vehicle being currently driven. The communicator 110 may receive satellite navigation information and correction information, and the vehicle position determiner 120 may analyze the satellite navigation information and correction information and may calculate first position information of the vehicle being currently driven. The vehicle position determiner 120 may calculate the current position of the vehicle by applying the first position information and position error information received at the communicator 110. For example, the position error information may be measured in such a manner that the fixed body calculates a difference value between fixed position information stored in the fixed body and position information based on satellite navigation information currently received from an outside. The position error information may include, for example, a position error vector. Due to an external environment such as a satellite state or weather, an error may be present in vehicle position information based on the satellite navigation information. Here, based on the assumption that the reception environments are same within the preset distance radius, it is possible to further precisely verify a current position of the vehicle by correcting position information being received at the vehicle based on position error information measured at the fixed body.

The stop detector 130 may detect whether the vehicle is stopped and may transmit a signal indicating that the vehicle is in a stop state to the vehicle position determiner 120. Compared to a situation in which satellite navigation information is transmitted and received in a vehicle being driven, a situation in which satellite navigation information is transmitted and received in the vehicle being stopped may be relatively close to a transmitting and receiving environment of the fixed body. The communicator 100 may receive the signal indicating that the vehicle is in the stop state and may transmit a request for position error information to the fixed body within a preset distance radius. Since position error information about first position information is applied in the stop state of the vehicle, a relatively further reliable current position of the vehicle may be calculated and a position precision of the vehicle being autonomously driven may be enhanced.

The vision detector 140 may detect image information of a lane and may acquire driving lane information corresponding to the image information. The vision detector 140 may determine whether a lane on which the vehicle is being driven corresponds to a first lane or a last lane based on a lane line of the driving lane. For example, the vision detector 140 may detect two scarlet solid lines indicating the centerline or a single white solid line indicating the last lane. Accordingly, the vision detector 140 may acquire lane line information about a lane on which the vehicle is being driven. The vehicle position determiner 120 may calculate a current position of the vehicle by comparing the first position information and driving lane information and by correcting the first position information.

For example, the vehicle position determiner 120 may calculate first position information based on the received satellite navigation information and may apply the first position information to a road map stored in the autonomous vehicle assistance device 100. Information applied to the road map may be compared to driving lane information about the lane on which the vehicle is being currently driven. Information indicating that the vehicle is being driven on a first lane may be detected from the driving lane information acquired through the vision detector 140. However, when the vehicle is close to a second lane based on information applied to the road map, the vehicle position determiner 120 may correct first position information and may correct a current position of the vehicle to be close to the first lane. When a difference value with the driving lane information acquired from the vision detector 140 is input to be greater than or equal to a preset value, the vehicle position determiner 120 may determine that the vision detector 140 is in a malfunctioning state. The vehicle position detector 120 may output the malfunctioning state of the vision detector 140 on a display of the vehicle, or may inform the user of the malfunctioning state of the vehicle by transmitting the malfunctioning state of the vision detector 140 to a server through the communicator 110.

Figure 2:
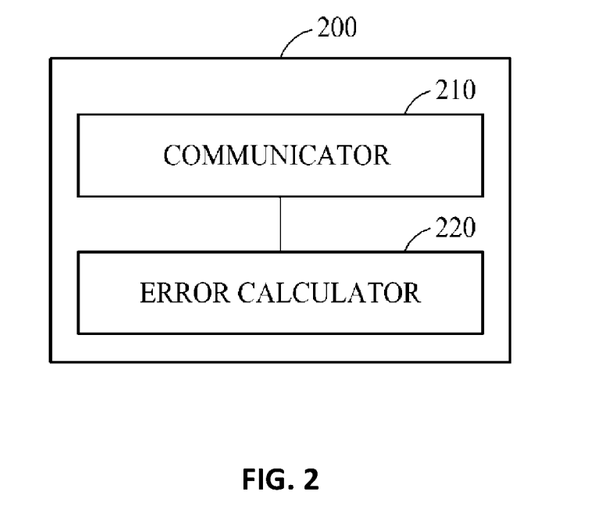
FIG. 2 is a block diagram illustrating an autonomous vehicle assistance device provided to a fixed body according to an embodiment.

FIG. 2 is a block diagram illustrating an autonomous vehicle assistance device fixed to a fixed body according to an embodiment. Referring to FIG. 2, the autonomous vehicle assistance device 200 includes a communicator 210 and an error calculator 220. The communicator 210 may receive satellite navigation information from an outside. The outside may include, for example, an artificial satellite for measuring a GPS. The satellite navigation information may include, for example, a stand-alone code. Also, the communicator 210 may receive correction information from a base station. The correction information may include, for example, a carrier based on a lane matching method.

The communicator 210 may receive a request for a position error vector from a vehicle within a preset radius and may transmit the position error vector to the vehicle. Also, the communicator 210 may transmit a unique identification signal of the autonomous vehicle assistance device 200 to the vehicle. When position information of a fixed body corresponding to the unique identification signal is stored in the vehicle, the vehicle being autonomously driven may compare a difference between position information based on a satellite navigation, received from a GPS and the like, and position information of the fixed body, may analyze a reliability of position information based on the satellite navigation currently received, and may calculate a current position of the vehicle.

The error calculator 220 may acquire first position information by analyzing the satellite navigation information received at the communicator 210 and correction information. Position information of the fixed body to which the autonomous vehicle assistance device 200 is mounted may be pre-stored in the autonomous vehicle assistance device 200. Accordingly, the error calculator 220 may compare internally pre-stored second position information and the first position information acquired by interpreting information received at the communicator 210 and as a result, may acquire a position error vector.

The position error vector may include a position error vector in each of a heading direction of the vehicle on a lane around a position at which the fixed body is installed and a direction perpendicular to the heading direction, in correspondence to the lane. As described above, in general, existing satellite navigation information may be transmitted and received in a form of 3D coordinate system information. However, in the autonomous vehicle assistance device 200 according to an embodiment, since information corresponding to a z axis of a coordinate system is not used, a position error vector in a two-dimensionally converted vector form in order to achieve fast signal processing and transmission of position transmission may be acquired.

Figure 3:
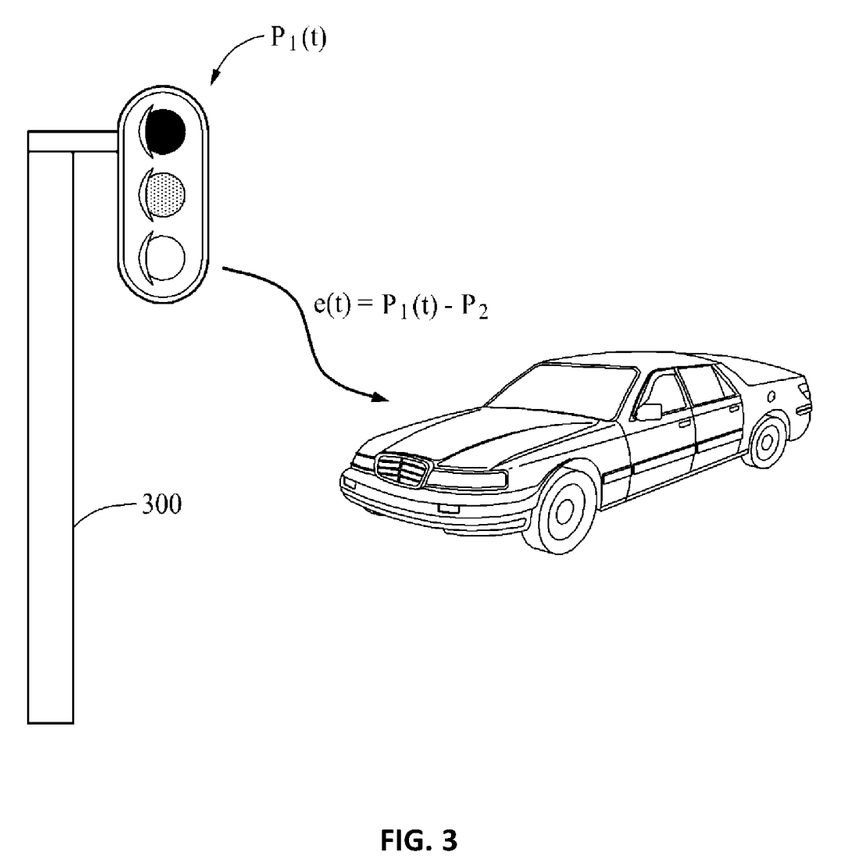
FIG. 3 illustrates a process of generating and transmitting a position error vector according to an embodiment.

FIG. 3 illustrates a process of generating and transmitting a position error vector according to an embodiment. A fixed body 300 to which an autonomous vehicle assistance device is provided may be, for example, a traffic light, however, is not limited thereto. Accordingly, those skilled in the art may understand that the autonomous vehicle assistance device according to an embodiment may be provided to any type of fixed bodies, for example, a traffic light, a road sign, and a closed circuit television (CCTV).

The autonomous vehicle assistance device may include a communicator capable of transmitting and receiving satellite navigation information. Referring to FIG. 3, $P_1(t)$ denotes real-time position information received at the communicator. Since the fixed body 300 is present at a fixed position, the fixed body 300 has the same position information. Due to a state of communication equipment or a transmission and reception environment, an error may occur in $P_1(t)$. From a functional formula, $P_1(t)$ is a value that varies over time. As described above, position information of the fixed body 300 to which the autonomous vehicle assistance device is mounted may be stored in the autonomous vehicle assistance device.

Figure 4A:
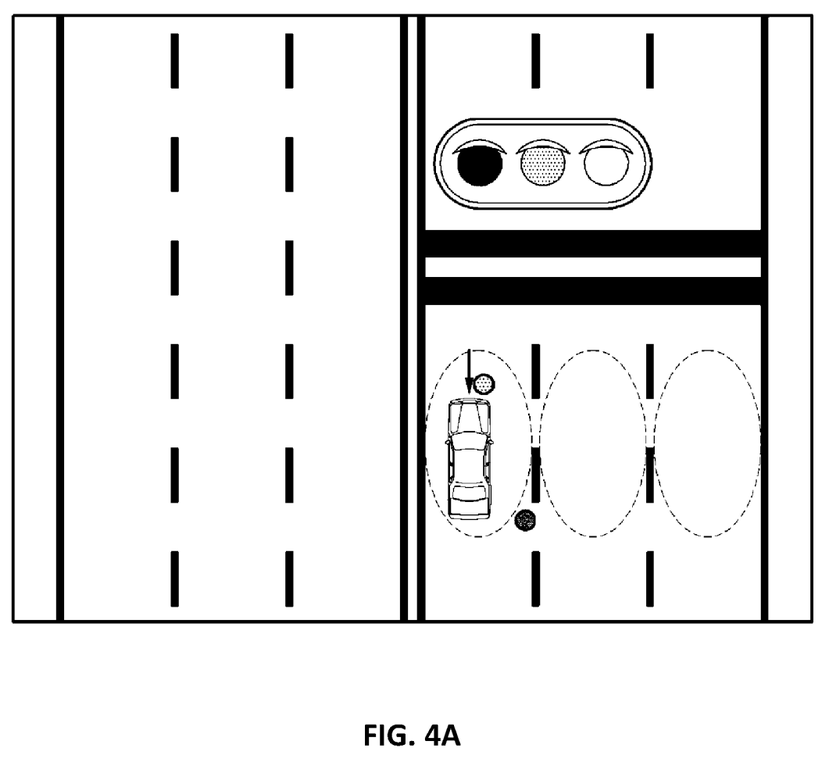
FIGS. 4A, 4B, and 4C illustrate examples of an interaction between two autonomous vehicle assistance devices according to an embodiment.
Figure 4B:
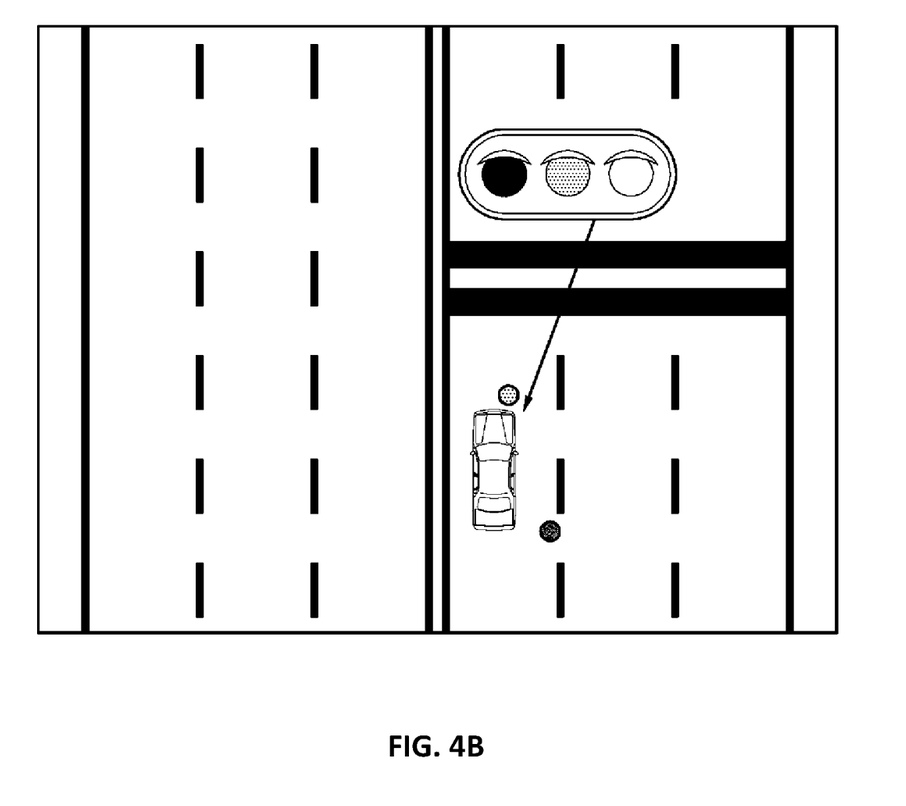
Figure 4C:
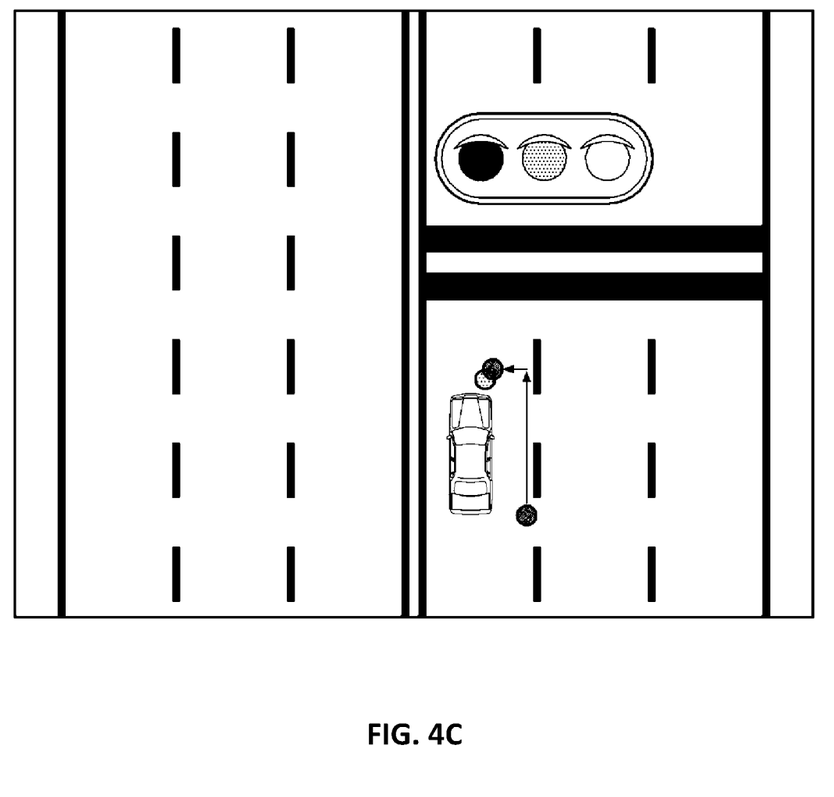

The stored position information corresponds to $P_2$ in FIG. 3 and a position of the fixed body 300 denotes a constant invariable over time. Thus, $P_2$ denotes a fixed constant value. The autonomous vehicle assistance device may calculate the position error vector $e(t)$ using $P_1(t)$ and $P_2$ through a calculator included in the autonomous vehicle assistance device. The position error vector may include a 2D vector value. The position error vector may be calculated using $e(t)=P_1(t)-P_2$. The calculator may acquire the position error vector by comparing the received position information to position information stored in the fixed body 300. The position error vector may be transmitted to the outside. The position error vector may be transmitted to a device that receives position information from an outside based on satellite navigation. For example, the device may be a travelling vehicle that includes the autonomous vehicle assistance device. The position error vector may include a 2D vector. Since satellite navigation information is 3D information and direction information used for vehicle driving is 2D information, the 2D vector may be output FIGS. 4A, 4B, and 4C illustrate examples of an interaction between two autonomous vehicle assistance devices according to an embodiment. FIG. 4A illustrates an example of an operation of an autonomous vehicle assistance device installed in a vehicle according to an embodiment. A vehicle being driven may acquire position information of the vehicle based on satellite navigation information and correction information. The satellite navigation information may be received through a communicator included in the autonomous vehicle assistance device. Referring to FIG. 4A, a circle filled in black denotes a position acquired through a GPS and a circle filled white denotes an actual position of the vehicle being driven. The vehicle being driven may compare driving vehicle information acquired through a vision detector to the position acquired through the GPS. For example, the vision detector may detect the centerline including two yellow sold lines or a lane line including a single white solid line on a three-lane road. Here, the vision detector may recognize that the vehicle is being driven on a first lane by detecting the centerline and may recognize that the vehicle is being driven on a last lane by recognizing the single white solid line. In this example, the vehicle being driven may recognize the centerline including two yellow solid lines and acquire driving vehicle information indicating that the vehicle is being driven on the first lane. The vehicle may compare the driving vehicle information to position information acquired through the GPS, may calculate a difference value between the driving vehicle information and the position information, and calculate the current position of the vehicle by applying the difference value. For example, calculation of the difference value may be performed by an error calculator included in the autonomous vehicle assistance device. In the present embodiment, the same result may be acquired from the driving vehicle information and the position information acquired through the GPS and thus, a position correction may not be required.

Referring to FIG. 4B, a vehicle being driven may acquire a position error vector of position information currently acquired from a fixed body through a GPS. The fixed body may be, for example, a traffic light. Regardless of matching between driving lane information and position information, a difference may be present between an actual position of the vehicle and a position of the vehicle acquired through the GPS. Accordingly, unless the difference is reduced, a fine adjustment may be impossible when the vehicle is being driven on a curved road or turning left or right. Accordingly, the difference may cause a great issue against an autonomous driving. According to an embodiment, there is provided an autonomous vehicle assistance device that may compare real-time GPS position information and a stored unique position of the vehicle and may transmit a position error vector. The autonomous vehicle assistance device may be installed in the fixed body. The fixed body may include, for example, a building, a traffic light, a road sign, and a CCTV. In the present embodiment, the vehicle being driven may receive a position error vector from a traffic light, and may acquire an actual position of the vehicle by applying the position error vector to position information acquired through the GPS.

FIG. 4C illustrates an example of correcting position information of a vehicle based on a position error vector acquired through a fixed body. Dissimilar to general GPS information corresponding to a 3D coordinate value, a position error vector for an autonomous driving may be a 2D vector. The 2D vector may include a heading direction of the vehicle and a direction perpendicular to the heading direction of the vehicle. A position close to an actual position of the vehicle may be acquired by applying the position error vector to position information acquired through a GPS. For example, position correction may be performed by a vehicle position determiner included in the autonomous vehicle assistance device. Referring to FIG. 4C, position information (indicated by a circle filled in black) acquired based on GPS information may be corrected based on the position error vector to be close to an actual position of the vehicle (indicated by a circle filled in white). The current position of the vehicle may be further accurately calculated.

Figure 5:
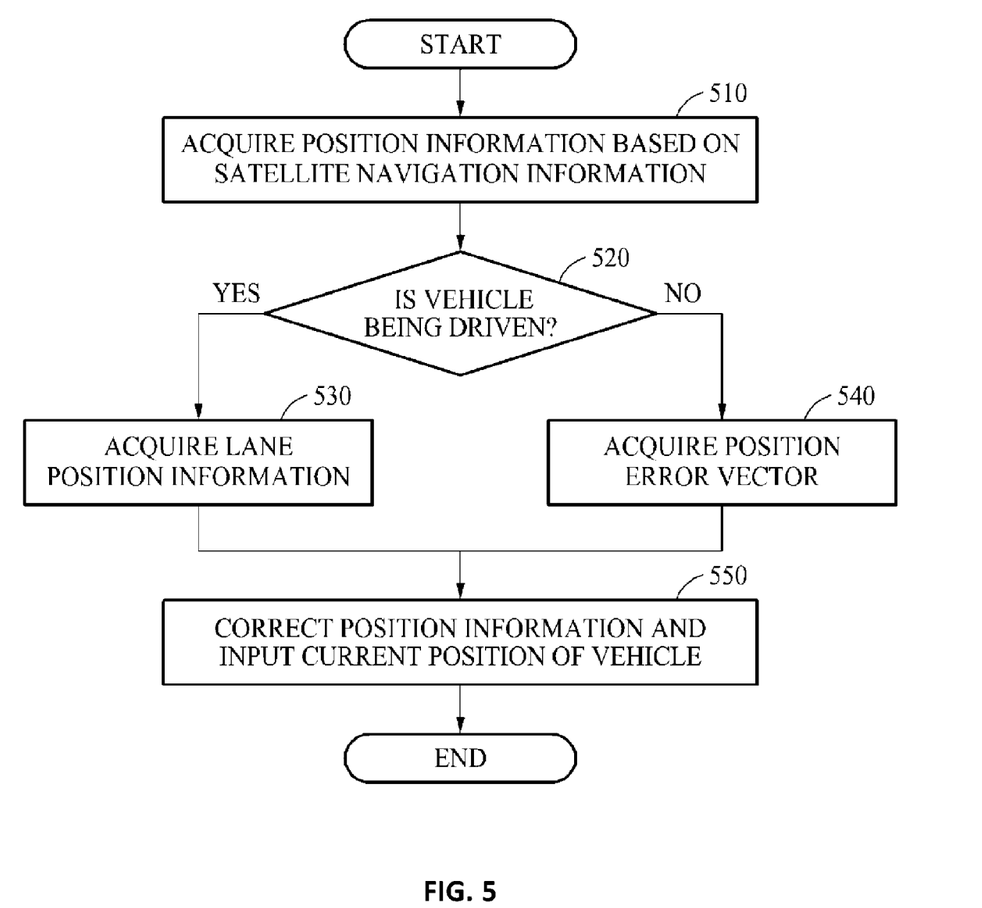
FIG. 5 is a flowchart illustrating an autonomous vehicle assistance method according to an embodiment.

FIG. 5 is a flowchart illustrating an autonomous vehicle assistance method according to an embodiment. In operation 510, position information may be acquired based on satellite navigation information. More specifically, position information may be acquired based on satellite navigation information received from a satellite and correction information received from a base station. The satellite navigation information may include a code based on a GPS. The correction information may include information that includes a carrier. Under a precise carrier reception environment, a position accuracy of a centimeter (cm) unit may be acquired in operation 510. When the present disclosure is employed for an unmanned vehicle and device, the position accuracy is to be enhanced. Hereinafter, a process of enhancing the position accuracy will be further described.

In operation 520, whether the vehicle is being driven may be determined. Operation 520 may be performed by a stop detector, for example, the stop detector 130 of FIG. 1. When the vehicle is determined to be in a stop state in operation 520, operation 540 may be performed. On the contrary, when the vehicle is determined to be being driven, operation 530 may be performed.

In operation 530, lane position information may be acquired. In operation 530, the lane position information may be acquired using a device, for example, a vision sensor, an infrared (IR) camera, and a laser scanner. Lane position information about a lane on which the vehicle is being driven may be acquired by analyzing an image of the lane. Further, whether the corresponding lane is a first lane or a last lane may be acquired by analyzing information associated with a color of the lane and whether the lane is indicated with solid lines or dotted lines.

In operation 540, a position error vector may be acquired. Since a fixed body is immovable, fixed position information of the fixed body may be stored and be compared to position information based on real-time satellite navigation. A comparison value therebetween may be generated as the position error vector and may be transmitted to the vehicle stopped within a preset radius from the fixed body. The stopped vehicle may acquire the position error vector through transmission and reception with the fixed body.

In operation 550, position information may be corrected and a current position of the vehicle may be input. For example, in operation 550, correction may be performed to enhance the position accuracy of position information acquired in operation 510. When the vehicle is being driven, the correction may be performed based on the lane position information acquired in operation 530. When the vehicle is stopped, the correction may be performed based on the position error vector acquired in operation 540. Operation 550 may be performed by a vehicle position determiner that includes a processor.

The devices described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described embodiments, or vice versa.

While this disclosure includes specific examples, it will be apparent to one of ordinary skill in the art that various changes in form and details may be made in these examples without departing from the spirit and scope of the claims and their equivalents.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An autonomous vehicle assistance system comprising:
a fixed body, comprising:
a communicator configured to receive satellite navigation information and correction information from a base station; and
an error calculator configured to acquire first position information corresponding to the satellite navigation information and the correction information, to calculate a difference value between the first position information and second position information stored in the autonomous vehicle assistance device, and to acquire a position error vector; and an autonomous vehicle assistance device provided in an autonomous vehicle, comprising:
a vehicle communicator receiving satellite navigation information and, when the fixed body is present within a predetermined distance radius, the vehicle communicator receives the position error vector therefrom;
a vehicle position determiner analyzing the satellite navigation information and the position error vector to calculate a vehicle first position information, and wherein the vehicle position determiner calculates a current position of the autonomous vehicle by applying the vehicle first position information and the position error vector received at the vehicle communicator;
a vision detector configured to detect image information of a lane and to acquire driving lane information corresponding to the image information, wherein the vision detector corrects the vehicle first position information based on the driving lane information; and
a stop detector detecting whether the autonomous vehicle is stopped, the stop detector transmitting a signal indicating that the autonomous vehicle is in a stop state to the vehicle communicator, which, in turn, transmits a request for the vehicle position error vector to the fixed body within the predetermined distance radius, wherein
the position error vector is transmitted and received in a two-dimensionally converted vector form.

2. The autonomous vehicle assistance device of claim 1, wherein the communicator is further configured to receive a request for the position error vector from a vehicle within a preset radius and to transmit the position error vector to the vehicle.

3. The autonomous vehicle assistance device of claim 1, wherein the communicator is further configured to transmit a unique identification signal of the autonomous vehicle assistance device corresponding to the second position information.

4. The autonomous vehicle assistance device of claim 1, wherein the error calculator is further configured to acquire the position error vector in each of a heading direction of the vehicle on a lane around a position at which the fixed body is installed and a direction perpendicular to the heading direction, in correspondence to the lane.

5. The autonomous vehicle assistance device of claim 1, wherein the second position information is a position information of the fixed body.

6. The autonomous vehicle assistance device of claim 5, wherein the first position information is real-time position information received at the communicator and the second position information is fixed constant value.

7. An autonomous vehicle assistance device provided in an autonomous vehicle, comprising:
a vehicle communicator receiving satellite navigation information and, when a fixed body, having receive satellite navigation information and correction information from a base station, is present within a predetermined distance radius, the vehicle communicator receives a position error vector therefrom;
a vehicle position determiner analyzing the satellite navigation information and the position error vector to calculate a vehicle first position information, and wherein the vehicle position determiner calculates a current position of the autonomous vehicle by applying the vehicle first position information and the position error vector received at the vehicle communicator;

a vision detector configured to detect image information of a lane and to acquire driving lane information corresponding to the image information, wherein the vision detector corrects the vehicle first position information based on the driving lane information; and a stop detector detecting whether the autonomous vehicle is stopped, the stop detector transmitting a signal indicating that the autonomous vehicle is in a stop state to the vehicle communicator, which, in turn, transmits a request for the vehicle position error vector to the fixed body within the predetermined distance radius.

8. The autonomous vehicle assistance device of claim 7, wherein the position error vector is transmitted and received in a two-dimensionally converted vector form.

9. The autonomous vehicle assistance device of claim 7, wherein the fixed body includes:

a communicator configured to receive satellite navigation information and correction information from a base station; and an error calculator configured to acquire first position information corresponding to the satellite navigation information and the correction information, to calculate a difference value between the first position information and second position information stored in the autonomous vehicle assistance device, and to acquire a position error vector.

10. The autonomous vehicle assistance device of claim 7, wherein the vision detector is further configured to recognize a first driving lane information that the vehicle is being driven on a centerline based on two yellow solid lines and a second driving lane information that the vehicle is being driven on a last lane based on a single white solid line.

* * * * *